United States Patent [19]

Beaufrere

[11] 3,932,988

[45] Jan. 20, 1976

[54] FUEL SLINGER COMBUSTOR

[76] Inventor: Albert H. Beaufrere, Private Road, Huntington, N.Y. 11743

[22] Filed: June 24, 1974

[21] Appl. No.: 482,805

Related U.S. Application Data

[62] Division of Ser. No. 300,774, Oct. 25, 1972, Pat. No. 3,818,696.

[52] U.S. Cl. .......... 60/39.71; 60/39.74 S; 60/39.36; 239/214.17
[51] Int. Cl.² .......................................... F02C 7/22
[58] Field of Search...... 60/39.74 S, 39.71, 39.74 R, 60/39.74 B; 239/214.15, 214.17

[56] References Cited
UNITED STATES PATENTS

| | | | |
|---|---|---|---|
| 1,539,111 | 5/1925 | French et al. | 60/39.74 S |
| 2,602,292 | 7/1952 | Buckland et al. | 60/39.71 |
| 3,115,011 | 12/1963 | Deinhardt et al. | 60/39.74 S |
| 3,530,667 | 9/1970 | Bryan | 60/39.74 R |
| 3,703,259 | 11/1972 | Sturgess et al. | 60/39.74 B |

FOREIGN PATENTS OR APPLICATIONS

| | | | |
|---|---|---|---|
| 1,284,281 | 1/1962 | France | 60/39.74 S |
| 1,014,791 | 8/1957 | Germany | 60/39.74 S |
| 1,138,588 | 10/1962 | Germany | 60/39.74 S |

*Primary Examiner*—Carlton R. Croyle
*Assistant Examiner*—Robert E. Garrett

[57] ABSTRACT

Fuel slinger combustor, regenerative air-cooled gas turbine engine embodying the same, characterized by a pre-mix chamber in which fuel is well atomized by being projected against an impingement ring and further atomized and intimately mixed by the shearing action of cool unregenerated opposing swirling air. The remaining primary air also not heated by the regenerator enters through swirl louvres or ports which maintains the fuel-air mixture in a high recirculation state for clean and stable combustion at very lean mixtures. High pressure fuel is fed to the slinger by a high pressure fuel bearing-pump that makes possible starting the combustion at low speeds and at high altitudes.

4 Claims, 5 Drawing Figures

3,932,988

FUEL SLINGER COMBUSTOR

RELATED APPLICATION

This application is a division of my copending application Ser. No. 300,774 filed Oct. 25, 1972 now U.S. Pat. No. 3,818,696.

BACKGROUND OF THE INVENTION

It has long been recognized that the inherent advantages of the turbine engine, particularly its inherent clean burning characteristics and its high power-to-volume ratio, make the turbine engine a desirable alternative to the reciprocating piston engine for many applications. However, the reciprocating piston engine having been more or less universally adopted, the automotive and other industries have very large investments in engine production facilities, and the design of automobiles and other products is predicated on the reciprocating piston engine, so that commercial interest in turbine engines has been inhibited. Recent anti-pollution requirements have increased the interest in all alternatives to the reciprocating piston engine, and new advances in turbine engines have been made. To date, however, no turbine engine has been devised which is truly satisfactory for automotive and like applications.

Failure of prior-art workers to provide such an engine has resulted from a number of difficulties. One problem has been that not any gas turbine combustor has been devised which is almost completely free of harmful exhaust pollutants, particularly the oxides of nitrogen and at the same time is compact, simple and low in cost to produce. Another problem is starting the combustor at low speeds and at high altitudes without expensive high pressure fuel injection means.

OBJECTS OF THE INVENTION

A general object of the invention is to devise a gas turbine engine combustor which is relatively low cost, efficient and produces a minimum of harmful pollutants, particularly the oxides of nitrogen.

Another object is to provide a slinger type fuel atomization means which is adequate to supply and atomize the run fuel as well as adequate to start the combustion at low speeds and at high altitudes.

A further object is to provide a fuel slinger type combustor which has adequate combustion volume and which is compactly integrated for low cost with the turbomachinery of a gas turbine engine, particularly of the regenerative type.

SUMMARY OF THE INVENTION

The combustor comprises, at least a generally radial flow combustor zone, a secondary and cooling zones, a pre-mix chamber and at least one rotary fuel slinger atomizer where fuel to the slinger is fed by a simple high pressure fuel bearing-pump.

Very fine fuel atomization and intimate fuel-air mixing is accomplished in the pre-mix chamber by first the fuel being projected against an impingement ring and then further atomized by opposing swirls of air which in the case for regenerative engines comes direct from the compressor thus is relatively cool air. Also unheated by the regenerator the remaining primary combustion enters through swirl louvres or ports which maintains the fuel-air mixture in a high recirculating state for a clean and stable combustion at very lean mixtures. Thus requiring no costly fuel-air mixture ratio control.

The rotary fuel slinger atomizer is supplied by a high pressure fuel bearing-pump allowing the starting of the combustion at low starting speeds and at high altitudes. The combustion chamber is preferably mounted between the compressor and turbine for providing the greatest combustion volume and overall engine compactness and also providing a convenient part of the main shaft for mounting the fuel slinger.

In order that the manner in which the foregoing and other objects are achieved according to the invention can be understood in detail, one particularly advantageous embodiment thereof will be disclosed with reference to the accompanying drawings, which form a part of the original disclosure hereof, and wherein.

DESCRIPTION OF THE PREFERRED EMBODIMENT

Figure 1:
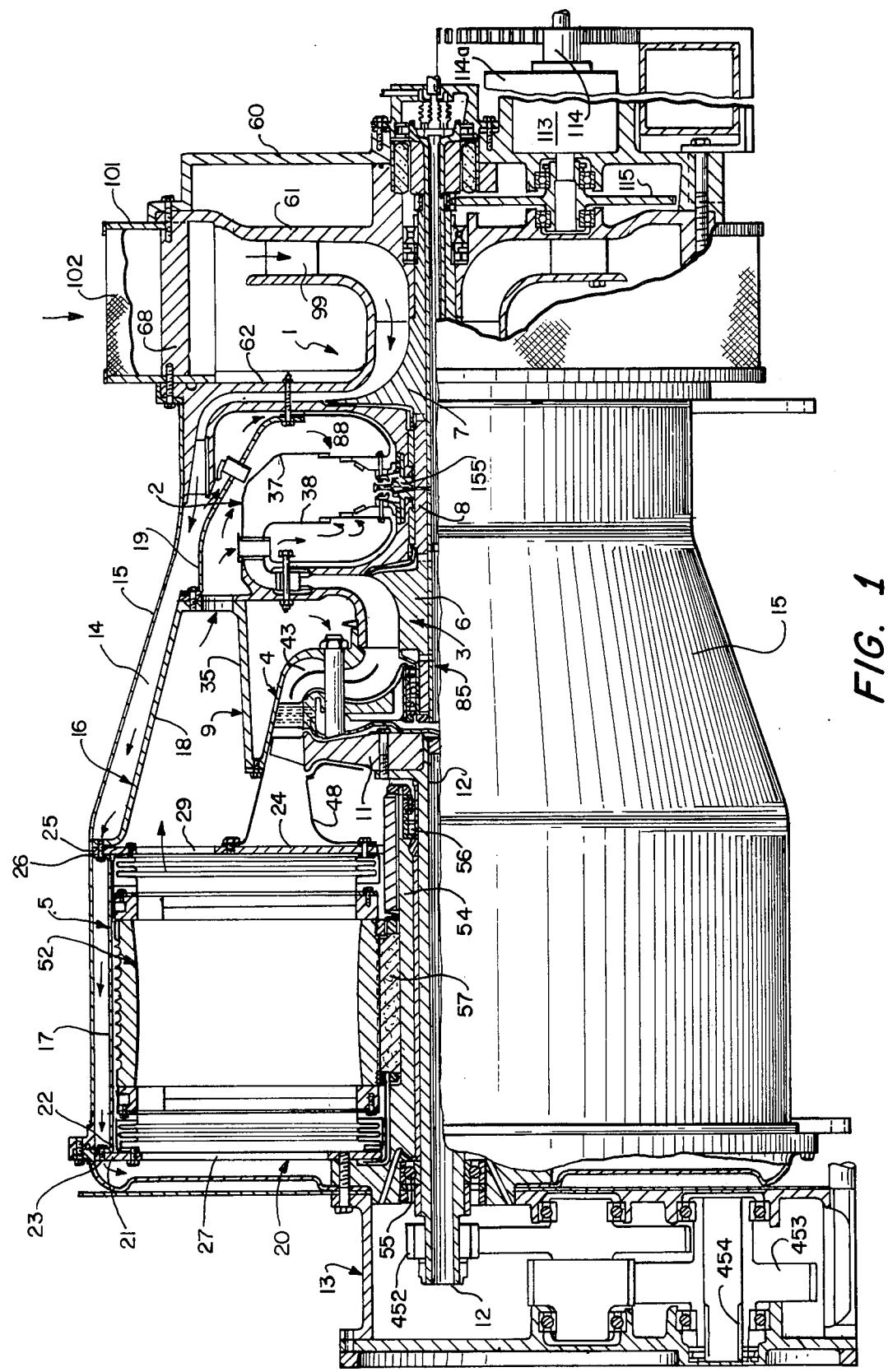
FIG. 1 is a view partially in longitudinal section and partially in side elevation of the combustor installed in a regenerative gas turbine engine.
Figure 2:
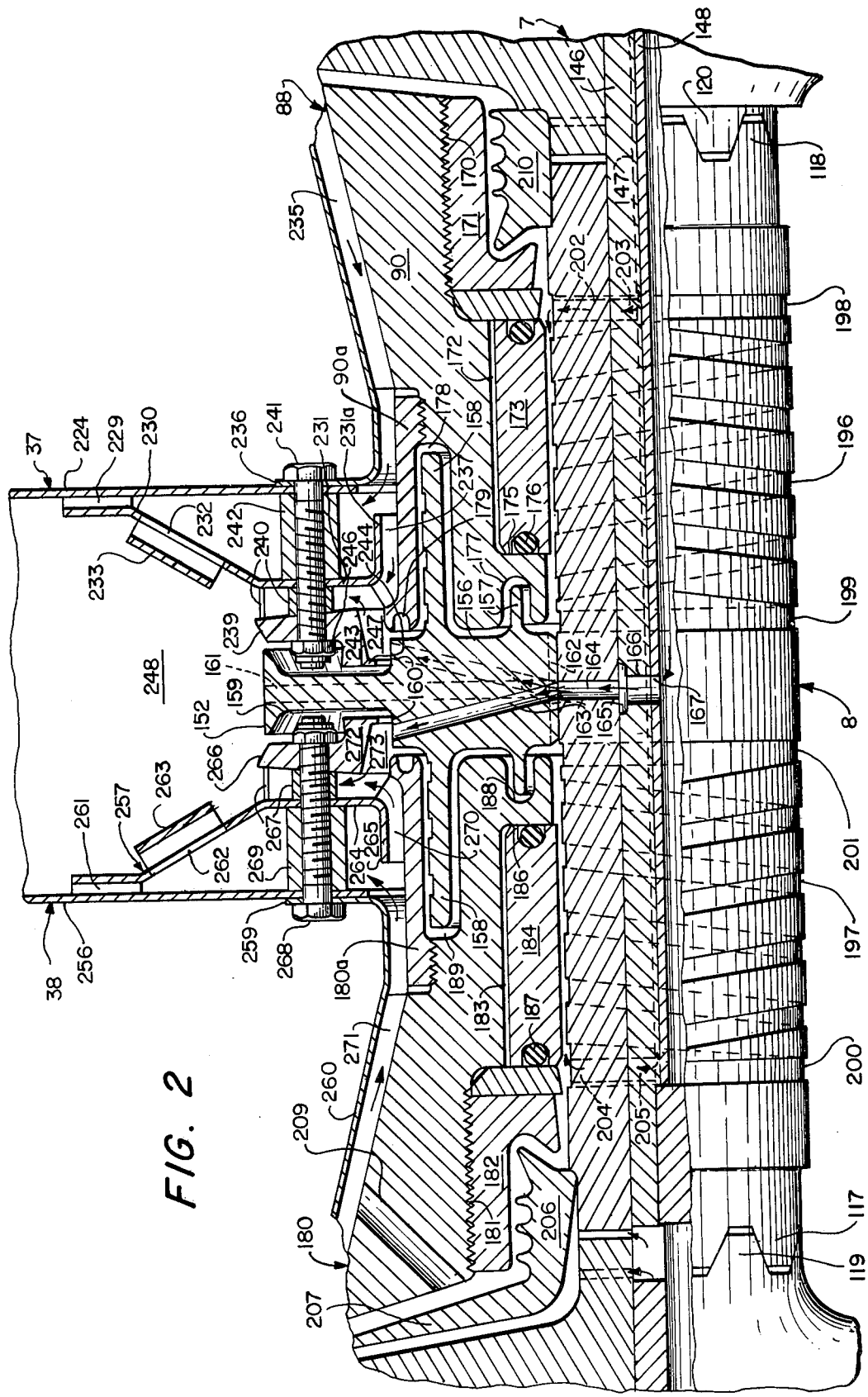
FIG. 2 is an enlarged view, mainly in longitudinal section of the rotary fuel slinger and primary zone of the combustor.
Figure 4:
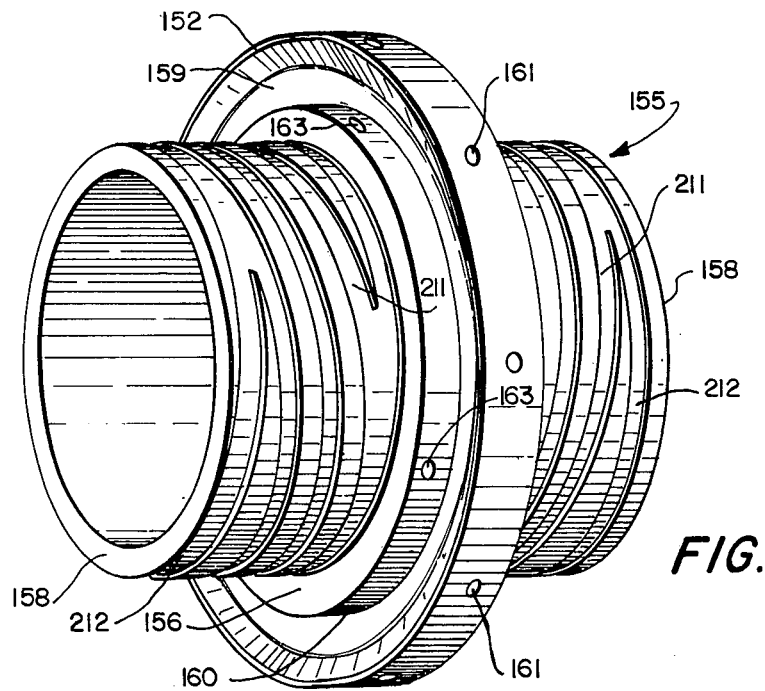
FIG. 4 is a perspective view of the rotary fuel slinger.
Figure 3:
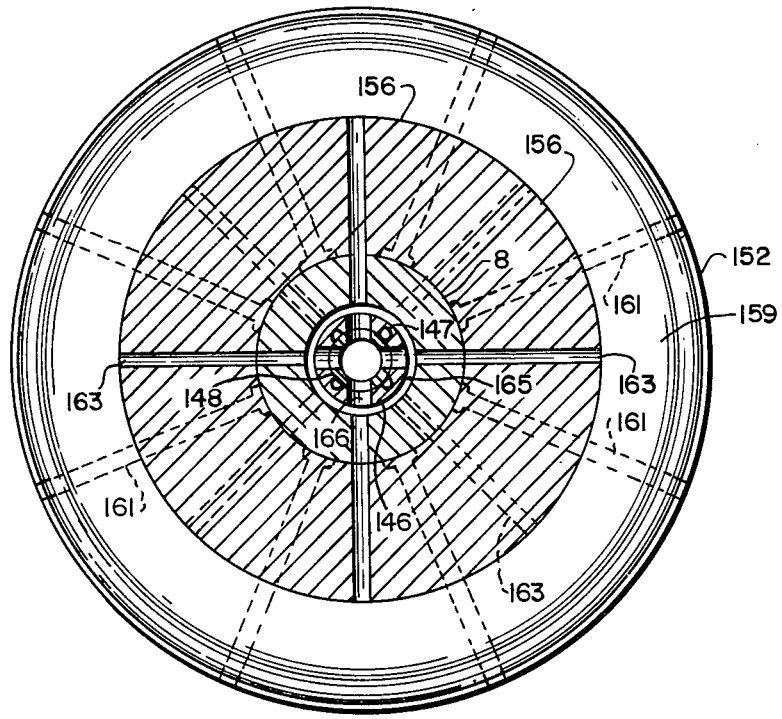
FIG. 3 is an enlarged radial section of the rotary fuel slinger.
Figure 5:
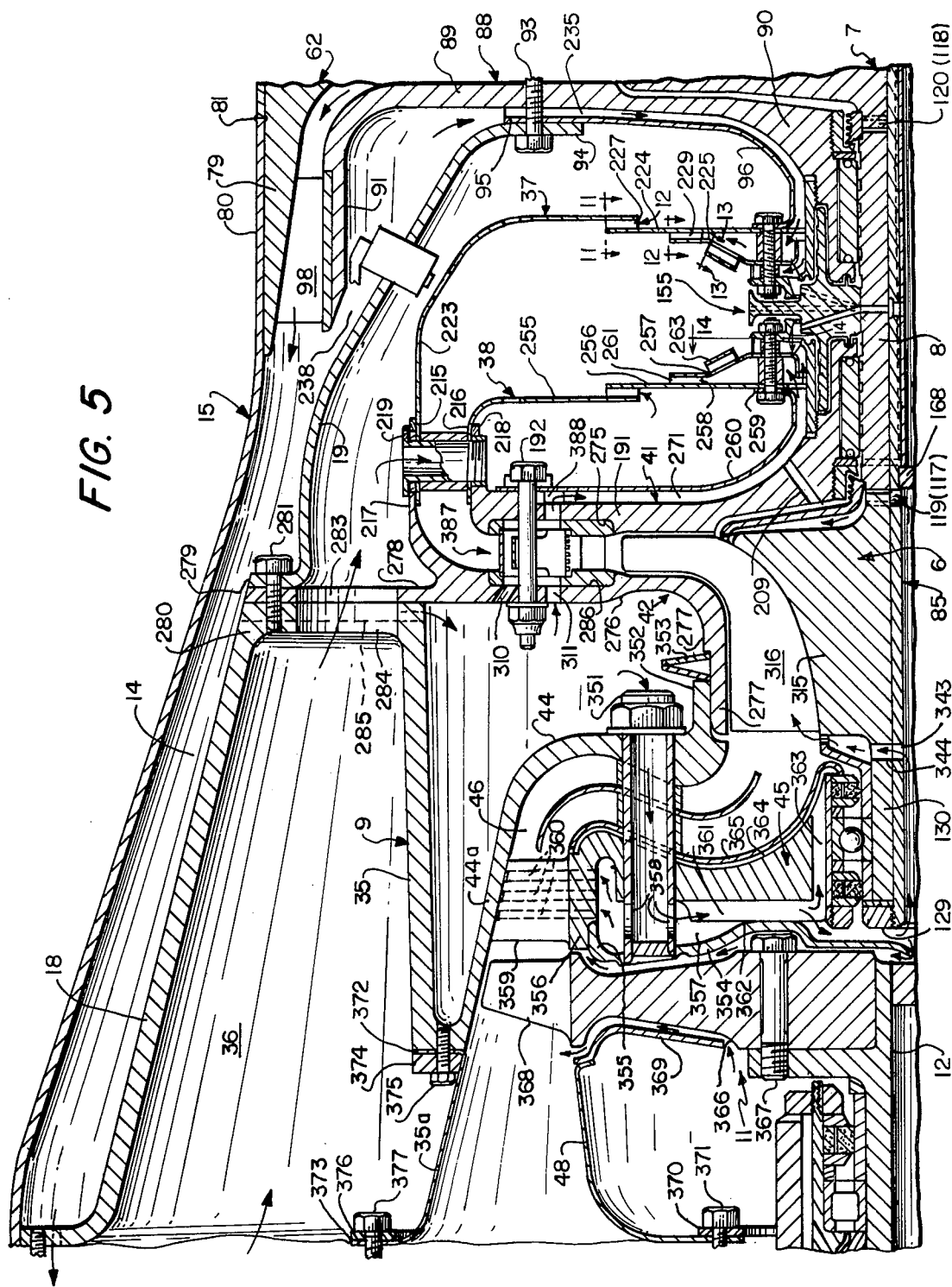
FIG. 5 is a longitudinal sectional view of the combustor mounted in the center of a gas turbine engine.

The combustor disclosed is suitable for gas turbine engines typically shown in FIGS. 1 and 5. Referring also to FIGS. 2, 3 and 4, the combustor generally comprises a rotary fuel slinger 155 mounted on a turbine or other suitable shafting 8, a fuel-air premix chamber 247 formed by generally planar walls 231 and 264 and concal walls 243 and 272, inlet air swirl vanes 270 and 237, fuel-air swirl vanes 267 and 240, a primary combustion zone 248 formed by walls 37 and 38 and said walls extended to also form a secondary combustion or mixing zone.

Fuel slinger 155 is an integral metal body having a central through bore which directly embraces shaft 8. The slinger body includes an inner hub portion 156 each face of which is equipped with a right cylindrical tubular axially projecting flange 157, a right cylindrical, tubular, axially projecting seal flange 158 concentric with the through bore and projecting axially therefrom in a location spaced a significant distance outwardly from flanges 157, and an outer peripheral disc portion 159 which is relatively thin as compared to the axial thickness of hub portion 156 and is of such diameter as to extend outwardly between the inner peripheral portions of combustor walls 37, 38. At its outer periphery, disc portion 159 has oppositely projecting tubular flanges 152 which are concentric with the shaft assembly. Since disc portion 159 is relatively thin and is axially centered on hub portion 156, hub portion 156 has right cylindrical outer peripheral surfaces 160 each on a different side of disc portion 158. A plurality of radial bores 161, FIG. 2, extend completely through disc portion 159 and hub portion 156. Each bore 161 communicates with a different one of a like number of axial grooves 162 in the wall of the central through bore of the slinger body. Hub portion 156 is also provided with a plurality of pairs of outwardly diverging bores 163, each bore 163 of each pair opening outwardly through a different one of the outer surfaces 160 of the hub portion. At their inner ends, bores 163 of each pair join and register with one of a plurality of radial bores 164, FIG. 2, in shaft 8. Bores 164 open inwardly into an annular space 165 defined by a reduced diameter portion of bolt shaft member 146, that member in turn being provided with a plurality of radial bores 166 which are registered with like openings 167 in tube 148 and therefore communicate between the interior of tube 148 and space 165. As shown in FIG. 4, there are typically four bores 166 and eight bores 163, the bores 166 therefore being of larger diameter than are bores 164, and space 165 affording free communication between bores 166 and bores 163. Bores 166 are each located between a different adjacent pair of axial grooves 147. In a location to the left of the slinger (as viewed in FIG. 5), a plug 168 closes the interior of tube 148 against fluid flow.

Hub and bearing support portion 90 of compressor shroud member 88 projects axially toward fuel slinger 155 and is concentric with and spaced outwardly from shaft 8. Portion 90 has an inner wall portion of larger diameter at 170 to accommodate a seal face ring and bearing retainer 171. The adjacent inner wall portion 172 is of smaller diameter to accommodate a bronze damper bearing 173 of plain cylindrical tubular form. The inner wall of portion 90 is completed by a portion 174 of still smaller diameter, that portion surrounding and being spaced only slightly outwardly from shaft 8. Wall portions 172 and 174 are joined by a transverse annular shoulder 175 which faces toward retaining ring 171. Each annular end face of bearing 173 is grooved to accommodate a high temperature silicone O-ring 176, one engaging ring 171 and the other engaging shoulder 175. Portion 90 has an inner annular recess 177 which is concentric with shaft 8 and opens toward the slinger to freely accommodate the corresponding tubular flange 157 of the slinger. Outwardly of recess 177, portion 90 is completed by a tubular element 90a, secured by threads at its end opposite the slinger. Portions 90 and 90a cooperate to define an annular recess 178, coaxial with shaft 8 and opening toward the slinger, to freely accommodate the corresponding seal flange 158 of the slinger. The inner and outer walls of recess 178 are right cylindrical and spaced slightly from the inner and outer surfaces, respectively, of flange 158. Outwardly of recess 178, portion 90 has an annular end face which is provided with a circular groove 179 concentric with shaft 8 and opening toward the corresponding face of slinger portion 156.

Back shroud 41 of compressor drive turbine 3 comprises a hub and bearing support portion 180 which is complementary to portion 90 of compressor shroud 88. Thus, shroud portion 180 includes larger diameter inner wall portion 181, to accommodate seal face ring and bearing retainer 182, an adjacent inner wall portion 183 of smaller diameter, to accommodate a bronze damper bearing 184, and an inner wall portion 185, of still smaller diameter, spaced slightly outwardly from shaft 8. Wall portions 183 and 185 are joined by a transverse annular shoulder 186. Bearing 184 is disposed between retainer 182 and shoulder 186, the end faces of the bearing being suitably grooved to accommodate high temperature silicone O-rings 187. Portion 180 has an inner annular recess 188 which is complementary to recess 177 and accommodates the corresponding tubular flange 157. Outwardly of recess 188, portion 180 is completed by a tubular element 180a secured by threads at its end opposite the slinger. Portions 180 and 180a cooperate to define an annular recess 189 which is complementary to recess 178 and accommodates the corresponding seal flange 158.

The axial position of hub and bearing support portion 90 of compressor shroud member 88 is fixed by the annular series of bolts 93. Similarly, with transverse annular portion 191 of drive turbine shroud member 41 secured rigidly by an annular series of bolts 192 to shroud member 42, and that member being secured to the integral casting 9, which includes wall 18 and is later described, the axial position of hub and bearing support portion 180 of shroud member 41 is fixed. The fuel slinger hub is fixed on shaft 8 and the axial position of shaft 8 in the overall assembly is fixed. Accordingly, the slinger is centered between shroud portions 90 and 180, sith only small clearances between the opposing transverse surfaces of the fuel slinger, on the one hand, and shroud portions 90 and 180, on the other hand.

At each side of the fuel slinger hub, shaft 8 has elongated portions embraced respectively by the bearings 173 and 184. The outer surfaces of these portions of shaft 8 are provided with helical pumping grooves 196 and 197, respectively, FIG. 2. Groove 196 opens into a transverse annular groove 198, at the end remote from slinger 155, and into a transverse annular groove 199 at slinger 155, groove 199 communicating directly with all of the axial grooves 162 in the slinger hub. Groove 197 similarly opens into transverse annular grooves 200 and 201, the latter groove also communicating with all of the grooves 162. Shaft 8 and bolt shaft member 146 are provided with a plurality of sets of aligned radial bores 202, 203, respectively, each set communicating between a different one of bolt shaft grooves 147 and groove 198. At the other end of shaft 8, that shaft and shaft member 146 are provided with a plurality of sets of radial bores 204, 205, respectively, each such set communicating between a different one of grooves 147 and groove 200. Start/idle fuel is supplied to both grooves 198 and 200. The combination of bearing 173 and ring 171 embraces the portion of shaft 8 which includes grooves 196, 198 and 199 and effectively covers those grooves. Similarly, the combination of bearing 184 and ring 182 embraces the portion of shaft 8 which includes grooves 197, 200 and 201 and effectively covers those grooves. The helical grooves 196 and 197 are oriented to move the fuel from grooves 198 and 200 inwardly to grooves 199 and 201, as the shaft assembly rotates during operation of the engine, and the fuel so moved is supplied via grooves 162 to the radial bores 161 of slinger 155. Rotation of the slinger causes the fuel to be projected outwardly into the combustion chamber as later described. Simultaneously, any fuel supplied to slinger bores 163 is also projected outwardly.

At the end of shaft 8 adjacent drive turbine 3, a labyrinth gas seal 206 embraces shaft 8 and has its fins positioned to cooperate with ring 182. Shroud portion 180 has a shallow annular recess which accommodates a radially elongated web 207 which forms an integral part of seal 206 and has a peripheral lip 208 which engages the outer peripheral portion of drive turbine bine rotor 6, for a purpose later described. Just outwardly of wall portion 181, shroud portion 180 is provided with a plurality of bores 209 which, as later described, supply air to the space between web 207 and shroud portion 180. At the opposite end of shaft 8, a labyrinth air seal 210 is provided between the shaft and ring 171.

The outer surfaces of seal flanges 158 of the fuel slinger are each provided with a helical pumping groove 211, and each groove 211 opens into a transverse annular groove 212 at the outer end of the seal flange. The adjacent outer walls of the recesses 178 and 189 cover the respective grooves 211, 212. Grooves 211 are oriented to cause any fluid therein to flow away from the fuel slinger 155 when the slinger rotates with the shaft assembly during operation of the engine. Accordingly, the seal flanges 158, cooperating with the walls of recesses 178 and 189, serve to oppose and effectively block the flow toward the combustion chamber of any fuel escaping outwardly between the transverse faces of the fuel slinger and shroud portions 180 and 90. Any fuel actually so escaping is diverted by flanges 152 into the path of the air-fuel mixture discharged from preliminary mixing chambers 247 and 273, later described.

Combustor wal member 37 includes an outer peripheral portion 215 which is tubular and concentric with the shaft assembly. Combustor wall member 38 has a tubular outer peripheral portion 216 which is spaced inwardly from portion 215 and concentric with the shaft assembly. Portions 215 and 216 are secured respectively to outer peripheral portion 217 of drive turbine shroud member 42 and outer peripheral portion 218 of shroud member 41 by an annular series of hollow screws 219. Portion 215 is formed with axially extending corrugations, so as to cooperate with the inner face of shroud portion 217 to form openings via which air can flow from the passage portion between walls 37 and 19 into the annular combustor outlet space between combustor wall portions 215 and 216, thus film-cooling these walls. A spacer sleeve 221 surrounds each screw 219 and has its ends engaged respectively with combustor wall portions 215 and 216 to firmly position the same. Portion 216 has axially extending corrugations, so as to cooperate with the outer face of shroud portion 218 to form openings via which air can flow from the space surrounded by wall portion 216 into the combustor outlet space.

Wall member 37 comprises an outer member 223, an intermediate member 224, and an inner member 225. From peripheral portion 215, outer member 223 extends in tubular fashion toward compressor 1 and then curves inwardly to extend in a flat plane transverse to the shaft assembly. The inner peripheral portion of outer member 223 is deformed in flat hill-and-dale fashion to present a plurality of flat crest portions 226 which are spaced from the body of member 223 toward the interior of the combustor, portions 226 being secured, as by welding, to the flat outer peripheral portion of intermediate member 224. Accordingly, the inner peripheral portion of member 223 and the outer peripheral portion of member 224 cooperate to define an annular series of openings 227 which are in the nature of conduits, in the sense of having adequate length to direct fluid flow, and which communicate between the space between wall member 37 and compressor shroud member 88, on the one hand, and the interior of the combustor, on the other hand. Intermediate member 224 is flat and lies in a plane transverse to the shaft assembly, extending inwardly well beyond the outer periphery of member 225. At its outer periphery, member 225 is deformed in flat hill-and-dale fashion to present a plurality of flat crest portions 228 which are spaced from the plane of member 225 toward member 224. Portions 228 are secured, as by welding, to the adjacent portion of member 224, so that the outer peripheral portion of member 225 and the adjacent portion of member 224 cooperate to define an annular series of openings 229 in the nature of conduits and communicating between the space between members 224 and 225, on the one hand, and the interior of the combustor, on the other hand.

Member 225 includes a frusto-conical intermediate portion 230 which tapers inwardly toward shaft 8 and away from shroud member 88, and is completed by a flat inner peripheral portion 231 which lies in a plane transverse to the shaft assembly, and a tubular portion 231a, which is concentric with the shaft assembly and projects from portion 231 toward member 88. Intermediate portion 230 is pierced and bent to provide a plurality of rectangular openings 232 and associated air flow directing fins 233, the latter being on the side of portion 230 facing the interior of the combustor.

Commencing along a circular line outside of the ring of bolts 93, the face of inner compressor shroud member 88 which is directed toward the combustor is provided with a plurality of grooves 235 which extend first radially inwardly and then axially for a short distance along the outer surface of hub and bearing support portion 90. Wall 96 extends along this face of member 88 from the outer ends of grooves 235 to a position beyond the inner ends of grooves 235 and there curves outwardly to extend as a flat annular transverse flange 236 lying in face-to-face contact with the inner peripheral portion of member 224. As seen in FIG. 2, the outer diameter of portion 90a at the end thereof adjacent the inner ends of grooves 235 is approximately equal to that of a circle including the bottoms of the grooves 235. Accordingly, this part of portion 90a simply presents a cylindrical surface spaced inwardly from wall member 96. At its other end, portion 90a is outwardly enlarged and provided with a plurality of grooves 237 each having an inlet end axially aligned with a different one of grooves 235 and an outlet end between the inner portion of wall member 225 and the adjacent peripheral surface 160 of the slinger hub. Grooves 237 are of smaller transverse cross-sectional area than grooves 235, and grooves 237 are angularly displaced to direct air in opposition to the direction of rotation of the slinger.

At their outer ends, grooves 235 communicate with the annular space between outer tubular portion 91 of compressor shroud 88 and wall member 19, and that space in turn communicates with passage 14 via the small annular space 238 between the tip of portion 91 and wall 19. Accordingly, cool air discharged from compressor 1 is directly available to grooves 235. Since grooves 235 are covered by wall 96, the grooves act as air flow channels leading to the annular space between the inner end of wall 96 and the smaller diameter, ungrooved portion of element 90a. Part of the air thus supplied travels outwardly, via the space between combustor wall members 224 and 225, to flow through openings 232 into the combustor. The remainder of the air from grooves 235 flows through grooves 237 to be discharged as hereinafter described.

The combination of inner peripheral portion 231 of combustor wall member 225, the inner portion of wall member 224, and of wall member 96 supports a ring 239, FIG. 2, and a plurality of swirl vanes 240. A plurality of bolts 241 are arranged in an annular series and each extends through aligned openings in elements 236, 224, 231 and 239, a spacing sleeve 242 being provided for each bolt, between portion 231 and member 224, to rigidify the structure. Ring 239 is of generally L-shaped radial cross section and is disposed with the annular conical wall 243 projecting toward the adjacent face of disc portion 159 of slinger 155, the shape, dimensions and location of ring 239 being such that conical wall 243 tapers frusto-conically inwardly toward the adjacent face of disc portion 159 and surrounds but is spaced significantly outwardly from the corresponding one of the peripheral surfaces 160 of the slinger hub portion. Conical wall 243 terminates in an annular lip 244 which curves inwardly toward surface 160 and extends along a line closely adjacent to the face of disc portion 159. The main body 245 of ring 239 extends outwardly to terminate adjacent the corresponding flange 152 of slinger disc portion 159, there being adequate radial space between flange 152 and web 243 to accommodate the nuts 246 for bolts 241. There is a substantial annular space between ring 239 and wall portion 231 which is interrupted only by the swirl vanes 240.

The combination of wall portion 231, surface 160, the adjacent face of slinger disc portion 159, and the web 243 of ring 239 defines an annular preliminary mixing chamber 247. For each divergent pair of bores 163, one bore 163 is directed toward the inner face of conical wall 243, at an angle such that fluid discharged from the bore and striking the conical wall is deflected toward wall portion 231. Accordingly, when slinger 155 rotates and fuel is supplied via conduit 137, fuel is continuously projected outwardly from the corresponding bores 163, passing through chamber 247 and impinging forcibly against the inner face of conical wall 243. Concurrently, assuming that combustion has commenced, relatively cool air direct from the compressor is drawn through grooves 235 and 237 into chamber 247 and is uniformly mixed with the fuel, the fuel having been disrupted into droplets by the slinger action and by impingement against conical wall 243. Further atomization of the fuel is accomplished by the opposite swirling air issuing from grooves 237 which constitute air directing vane passages. Accordingly, a uniform mixture of cool air and atomized fuel passes radially outwardly through the space between ring 239 and wall portion 231 into the primary combustion zone 248 of the combustion chamber, with a predetermined spiral or swirl direction imparted by vanes 240. Concurrently, cool air from grooves 235 is also supplied directly to the primary combustion zone 248 (without being mixed with fuel) via openings 232. Cool air from grooves 235, again without being mixed with fuel, is introduced into the combustion chamber, generally at the outer boundary of primary combustion zone 248, via openings 229, this air being directed radially outwardly and serving mainly to cool the combustion products generated in zone 248. Passage of fuel outwardly between ring 239 and slinger disc portion 159 is impeded because of the close proximity of lip 244 to the slinger disc and of flange 152 to body 245 of ring 239.

The remaining structure of the combustor is generally complementary to that described with reference to wall member 37, and is mainly to confine the secondary air mixing zone when the hot gas is cooled to allowable turbine inlet temperatures. Thus, wall member 38 includes an outer member 255, an intermediate member 256, and an inner member 257. The inner peripheral portion of member 255 is bent in flat hill-and-dale fashion, with the flat crests secured to the outer peripheral portion of member 256 to provide openings 258. Intermediate member 256 is flat and its inner peripheral portion lies in face-to-face engagement with the outwardly projecting flange 259 of air flow confining wall member 260. The outer peripheral portion of inner member 257 is bent in flat hill-and-dale fashion and has its flat crests secured to member 256 to provide openings 261. Member 257 includes a frustoconical intermediate portion having an annular series of rectangular openings 262 each equipped with an air flow directing louvre 263 bent from the sheet metal of member 257. Inner peripheral portion 264 of member 257 is flat and transverse to the shaft assembly, and member 257 is completed by a tubular portion 265 which is concentric with the shaft assembly and projects toward drive turbine 3.

A ring 266 and swirl vanes 267 are secured by bolts 268 to the combination of flange 259, member 256 and portion 264 of member 257, spacer sleeves 269 being provided between member 256 and portion 264 for rigidity. Portion 180 of drive turbine shroud member 41 includes a tubular element 180a which corresponds to element 90a of compressor shroud member 88. Element 180a has a plurality of grooves 270 which are covered by tubular portion 265 of wall member 257. Drive turbine shroud member 41 is provided with a plurality of radial grooves 271 which are covered by wall member 260 and each of which leads toward a different one of grooves 270. The combination of portion 264, conical wall 272 of ring 266, the adjacent face of slinger disc 159, and the corresponding peripheral surface 160 of the slinger hub defines a preliminary mixing chamber 273 which is in all respects complementary to chamber 247. One bore 163 of each divergent pair of slinger bores is directed toward web 272 of ring 266. When run fuel is supplied via conduit 137, rotation of the slinger supplies fuel to chamber 273 and that fuel is mixed with cool primary air from grooves 271, the mixture passing outwardly, through the space between portion 264 of member 257 and the main body of ring 266, into primary combustion zone 248. Vanes 267 impart a swirling motion to this fuel/air mixture in opposition to the spiral motion imparted to the fuel by rotation of the slinger. Concurrently, primary air from grooves 271 passes into the primary combustion zone via openings 262 and also outwardly into the combustion chamber via openings 261. This thoroughly atomized fuel premixed with the relatively cool compressor air minimizes local peak flame temperature and provides a minimum fuel residence time in the hot combustion zone, both of these characteristics minimizing exhaust pollutants, particularly the oxides of nitrogen.

What is claimed is:

1. In a combustor with a rotary slinger as the fuel injector, the combination of wall means defining a combustion zone and a premix chamber in flow communication with said combustion zone; a rotary fuel slinger attached to shaft means to project atomized fuel in said premix chamber with a predetermined tangential swirl component; said premix chamber having an inlet means to supply inlet air to said premix chamber; air directing means in said inlet air means for directing said inlet air with a tangential swirl component opposite to said predetermined swirl component whereby the air is directed into and mixed with the projected fuel before the fuel reaches the combustion zone; and said wall means for the premix chamber comprising generally planar side walls and at least one conical wall surrounding said slinger so as to redirect the fuel into the path of the inlet air to the premix chamber; and said wall means further comprising additional air directional means disposed to direct main primary combustion air into a heavy recirculation swirl of fuel/air mixtures in said combustion zone.

2. The combination of claim 1 wherein the rotary fuel slinger further comprises slinger means to supply fuel directly into said combustion zone.

3. The rotary fuel slinger in claim 1 further comprising first helical grooves on said shaft means; means to supply fuel to said helical grooves, a disc means generally centered on said shaft means, radial holes in said disc means communicating with the combustor and with said first helical grooves on said shaft means which transmits fuel to slinger means.

4. The combination of claim 3 wherein said disc means further comprises flange means thereon; second helical grooves within said flange means, passage means connecting said helical grooves with the combustor and said first helical grooves; wherein said second helical grooves are, operated upon rotation of said fuel slinger, to pump unatomized fuel from the combustor to said first helical grooves.

* * * * *